United States Patent
Melik-Aslanian et al.

(10) Patent No.: US 8,805,736 B2
(45) Date of Patent: Aug. 12, 2014

(54) FRAUD PREVENTION AND REPLACEMENT OF CREDIT/DEBIT CARDS—LOST, STOLEN, DEFECTIVE OR FRAUDULENTLY USED

(76) Inventors: Stefan Melik-Aslanian, New York, NY (US); Linda Malek-Aslanian, New York, NY (US)

( * ) Notice: Subject to any disclaimer, the term of this patent is extended or adjusted under 35 U.S.C. 154(b) by 443 days.

(21) Appl. No.: 12/575,692

(22) Filed: Oct. 8, 2009

(65) Prior Publication Data

US 2010/0030677 A1 Feb. 4, 2010

Related U.S. Application Data

(63) Continuation-in-part of application No. 12/393,041, filed on Feb. 26, 2009.

(60) Provisional application No. 61/068,607, filed on Mar. 8, 2008.

(51) Int. Cl.
*G06Q 20/00* (2012.01)
*G06Q 20/34* (2012.01)
*G06Q 40/00* (2012.01)
*G07F 7/12* (2006.01)
*G06Q 20/24* (2012.01)
*G06Q 40/02* (2012.01)
*G07F 7/02* (2006.01)

(52) U.S. Cl.
CPC .............. *G07F 7/025* (2013.01); *G06Q 20/341* (2013.01); *G06Q 40/00* (2013.01); *G06Q 20/342* (2013.01); *G07F 7/12* (2013.01); *G06Q 20/24* (2013.01); *G06Q 20/347* (2013.01); *G06Q 20/00* (2013.01); *G06Q 20/354* (2013.01); *G06Q 40/02* (2013.01)
USPC .......................................................... 705/38

(58) Field of Classification Search
CPC .... G06Q 20/347; G06Q 20/00; G06Q 20/341
See application file for complete search history.

(56) References Cited

U.S. PATENT DOCUMENTS

2002/0138444 A1* 9/2002 Granfeldt et al. ............... 705/65
2005/0263588 A1* 12/2005 Babi et al. ..................... 235/380
2007/0168265 A1* 7/2007 Rosenberger .................. 705/30

OTHER PUBLICATIONS

Gift Cards Terms and Conditions at BB&T; at web.archive.org/web/20070203215029/http://www.bbt.com/bbt/giftcard/terms.html; Feb. 3, 2007.*
Laurier One Card; OneCard Food and Retail Services; 2007/2008; www.mylaurier.ca/onecard; 32 pages.*
Smart Cards by Jan De Clercq; 20 pages; Dec. 22, 2008 web.archive.org/web/20081222144152/http://technet.microsoft.com/en-us/library/dd277362.aspx.*

* cited by examiner

Primary Examiner — Ella Colbert
Assistant Examiner — Mary Gregg
(74) Attorney, Agent, or Firm — Israel Nissenbaum; Yitzy Nissenbaum

(57) ABSTRACT

A credit card security system method for preventing fraudulent use, comprising the steps of a credit card provider opening one account with two different card numbers, with a first "main credit card" and a second credit card for a spare. The main credit card is activated by the provider and the spare credit card remains "deactivated". On a pre-set time basis the credit card provider will automatically upon notice to the customer, deactivate the main card and activate the spare card. If any suspicious or fraudulent transaction is detected by the credit card provider, the main credit card is deactivated. If the transaction is authorized, then the main credit card is reactivated. If the transaction is not authorized, the spare credit card is activated to be used as the main credit card. The credit card provider then replaces the deactivated credit card with a new number and sends a new credit card with the new credit card remaining deactivated.

3 Claims, 9 Drawing Sheets

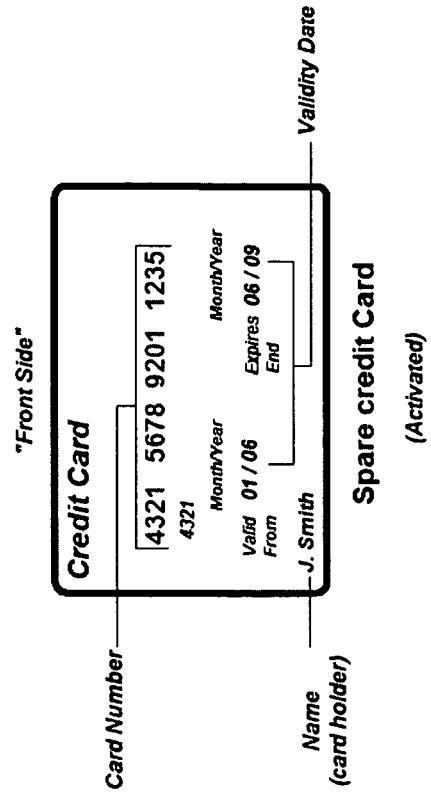
*Fig. 3*
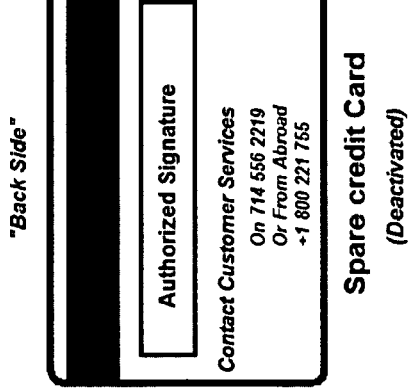
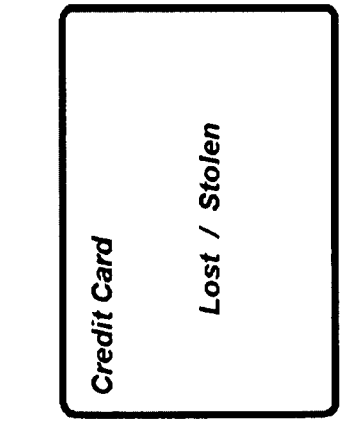
*Fig. 4*
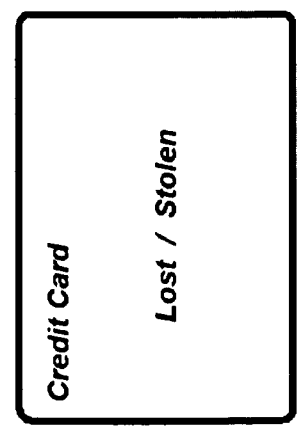

FRAUD PREVENTION AND REPLACEMENT OF CREDIT/DEBIT CARDS—LOST, STOLEN, DEFECTIVE OR FRAUDULENTLY USED

BACKGROUND

1. Field of the Invention

The present invention relates to credit/debit cards, and more specifically, a method and system offering immediate replacement of lost or stolen credit/debit cards.

2. Related Art

The potential for fraud in case a credit/debit card is lost or stolen has been a major concern for the credit card companies and financial institutions as well as the customers and the providers of the goods and services. Hereinafter, reference to "credit" cards, unless otherwise noted, encompasses both credit and debit cards. There have been many developments in an effort to overcome this fundamental problem of fraud. The credit card companies have an efficient credit card fraud protection system which is working well to block a lost or stolen credit card. The credit card companies also have an efficient credit card replacement system which has been working well to issue and send a new credit card to the customer in case their card has been lost or stolen. Most credit card companies claim that they can replace a lost or stolen credit card within 24 to 48 hours, if the customer carries the emergency replacement feature. But this replacement time period of 24 to 48 hours can be critical in many situations where the customer might need his/her card immediately, for example, while traveling out of town or being in an emergency situation. Therefore, a need exists for an improved system for replacement of lost or stolen credit cards.

OBJECTS AND SUMMARY OF THE INVENTION

The present invention is directed towards improving the existing credit card replacement system, by providing immediate replacement of a lost or stolen card. The problem for credit card replacement as noted above can be minimized in accordance with the principles of the present invention, by providing an additional "deactivated" credit card (spare credit card) to the customer.

The credit card company opens one account with two different card numbers, first card number for the "main credit card" and second card number for the "spare credit card". The credit card company provides the customer with two credit cards, a "Main Credit Card" and a "Spare Credit Card". The "Main Credit Card" will be the master credit card and will function identically as the existing credit cards. The "spare credit card" will also function identical to the existing credit cards, but will be "activated" for use, only when the "main credit card" is reported as lost or stolen by the customer to the credit card company. Both credit cards will never be activated at the same time. The credit card company will only "activate" the master card (main credit card) (unless otherwise indicated the term "master card" is a general term for "main card" and does not refer to and is not limited to the trademark Master-Card®) after receiving confirmation from the customer that he/she has received the two credit cards. The "spare credit card" will remain "deactivated".

When the customer reports his/her lost or stolen credit card to the company, then the credit card company blocks (Deactivates) the first credit card number (main credit card) and activates the second credit card number (spare credit card), to be used as the master credit card (main credit card). The credit card company will then replace the blocked (Deactivated) credit card number (first credit card number) with a new number and will send a new credit card (New Spare Credit Card) for the customer. The new credit card (New Spare Credit Card) will remain "deactivated".

The "deactivated" credit card (spare credit card) which will only be "activated" for use when the master credit card (main credit card) is reported as lost/stolen, should always be kept in a separate place. The two credit cards ("main credit card" and "spare credit card") should never be carried together.

Differentiation of Main and Spare Credit Cards: The two credit cards ("Main Credit Card" and "Spare Credit Card") should be distinguished from one another, in-order for the customer not to carry and use the wrong credit card (spare credit card) which is "deactivated". The distinguishable factor used for the two credit cards can be; a: sticker, b: color, c: name, other recognizable indicia or any other means. The following methods are examples of such distinguishing elements between the two cards:

a. Sticker: The credit card provider can place a sticker on the "spare credit card" in-order for the "spare credit card" to be distinguished from the "main credit card" and only when the "spare credit card" is to be used (activated), the customer will simply remove the sticker. The sticker can be in any color or form, or a special word such as, "spare" which can be written on the sticker.

b. Color: The two credit cards ("Main Credit Card" and "Spare Credit Card") can also be distinguished from one another by color. For example, the "Main Credit Card" can be in any color except Red and the "Spare Credit Card" will always come in Red.

c. Name: The two credit cards ("Main Credit Card" and "Spare Credit Card") can be distinguished from one another by name. For example the "Main Credit Card" can be named as "Credit Card" and the "Spare Credit Card" can be named as "Credit Card-T" as shown in FIG. 12.

If the customer already has a credit card, then the credit card company will add an additional new card number to the existing credit card account, to be used as the second credit card number (spare credit card). After receiving confirmation from the customer that he/she has received the "Spare Credit Card", the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name, general indicia or any other means.

Generally the present invention comprises a credit card use and security system method with immediate replacement capability comprising two credit cards issued to a single user by a financial institution. A first of the cards is active as a main card for transactions and a second spare card is inactive from transactions. With loss or theft of the first active main card, the first main card is deactivated by the financial institution and the second spare card is activated for immediate transaction use as a main card with an account. The financial institution issues at least one additional card according to one of the following options:

i) a new inactive spare card;

ii) a new active main card with the activated spare card being deactivated for use as a spare; and iii) a new active main card and a new deactivated spare card with the original activated spare card being destroyed.

Embodiments of the present invention include cards for one or two accounts as will be described.

The above and other objects, features and advantages of the present invention will become apparent from the following description of illustrative embodiments thereof to be read in conjunction with the accompanying drawings, in which like reference numerals represent the same or similar elements.

It is to be understood, however, that the drawings are designed solely for purpose of illustration and not as a definition of the invention.

BRIEF DESCRIPTION OF THE DRAWINGS

The foregoing, and other, objects, features and advantages of the present invention will be more readily understood upon reading the following detailed description in conjunction with the drawings in which:

FIG. 3 is a front side view of the "Main Credit Card" shown as "Lost/Stolen" and a back side view of the "Spare Credit Card" showing card holder signature space and customer service contact numbers. "Spare Credit Card" is shown as "Deactivated".

FIG. 4 is a front side view of the "Main Credit Card" shown as "Lost/Stolen" and a front side view of the "Spare Credit Card" showing name (card holder), validity date and card number as shown in FIG. 1. "Spare Credit Card" is shown as "Activated".

DETAILED DESCRIPTION

In this specification the term "credit card" refers to credit cards (Master Card®, Visa®, Diners Club®, etc.) as well as charge cards (e.g., American Express®, some department store cards), debit cards such as usable at ATMs and many other locations or cards that are associated with a particular account, and hybrids thereof (e.g., extended payment American Express®, bank debit cards with the Visa® logo, etc.).

Figure 1:
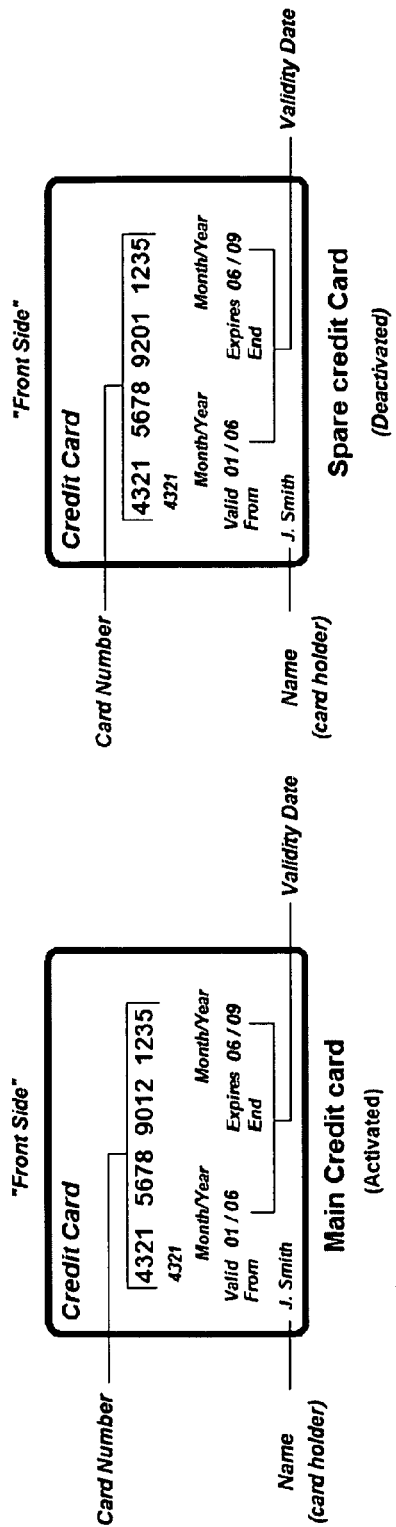
FIG. 1 is a front side view of the two credit cards, "Main Credit Card" and "Spare Credit Card" showing the same name (card holder) and validity date on both cards, with different credit card numbers. The "Main Credit Card" is shown as "Activated" and the "Spare Credit Card" is shown as "Deactivated".

Referring to FIG. 1, two credit cards are shown from the front side, ("Main Credit Card" and "Spare Credit Card") with basic identification information such as, a card number, name (card holder) and validity date. Both terms "Main Credit Card" and "Spare Credit Card" refer to credit cards as generally understood, namely, that which are allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

The credit card (Main Credit Card) will be "Activated" as soon as the customer confirms the receipt of both credit cards "Main Credit Card" and "Spare Credit Card" to the Credit card provider. The credit card "Spare Credit Card" will remain "Deactivated" as shown in FIG. 1.

Referring again to FIG. 1, the credit card provider will open one account with two different card numbers, first card number for the "main credit card" and second card number for the "spare credit card". Then the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the "Main Credit Card". The "Spare Credit Card" will remain "Deactivated".

The two credit cards ("Main Credit Card" and "Spare Credit Card") should be distinguished from one another, in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

According to the company policy the credit card company (Credit card provider) will either provide one Personal Identification number (PIN) for both credit cards or two different Personal Identification numbers (PIN) allocated to each one of the credit cards.

After the completion of this process, the customer will be instructed to carry and use only the "Main Credit Card" which is "Activated" and keep the "Spare Credit Card" which is "Deactivated" in a separate and safe place, such as at home. In case the customer is traveling out of town, again the customer should keep the credit card (Spare Credit Card) which is "Deactivated" in a separate and safe place, such as the hotel room or any place he/she is residing at that time. The customer should never carry both credit cards together.

After the validity dates on the two credit cards ("Main Credit Card" and "Spare Credit Card") have expired, the credit card provider will issue and send two new credit cards "Main Credit Card" and "Spare Credit Card" for the customer.

If the customer already has a credit card, then the credit card company will add an additional new card number to the existing credit card account, to be used as the second credit card number (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

Figure 2:
FIG. 2 is a back side view of the two credit cards, "Main Credit Card" and "Spare Credit Card" showing card holder signature space and customer service contact numbers. Main Credit Card is shown as "Activated" and Spare Credit Card is shown as "Deactivated".

Referring to FIG. 2, the same two credit cards are shown from the back side, (Main Credit Card) and (Spare Credit Card) with basic information such as, card holder signature space and customer service contact numbers. The Main Credit Card will be "Activated" as soon as the customer confirms the receipt of both credit cards ("Main Credit Card" and "Spare Credit Card") to the Credit card provider as shown and described in FIG. 1. The "Spare Credit Card" will remain "Deactivated".

If the customer already has a credit card, then the credit card company will add an additional new card number to the existing credit card account, to be used as the second credit card number ("spare credit card") for the customer. The customer confirms the receipt of the "Spare Credit Card" to the credit card provider as shown and described in FIG. 1. The "Spare Credit Card" will remain "Deactivated".

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

Referring to FIG. 3, the Main Credit Card is shown as "Lost/Stolen". The "Spare Credit Card" is shown from back side as described and shown in FIG. 2. The customer service contact numbers are listed on the back side of the "Spare Credit Card" as shown and described in FIG. 2 and FIG. 3. The "Spare Credit Card" remains "Deactivated".

Referring again to FIG. 3, the customer (card holder) calls the listed customer service contact numbers on the back side of the "Spare Credit Card" to report his/her "Lost/Stolen" credit card (Main Credit Card). For security check, the credit card provider will ask the customer (card holder) to provide information such as, name, validity date, card number, PIN number, etc. Because both credit cards ("Main Credit Card" and "Spare Credit Card") are issued to one person, then the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 4, the Main Credit Card is shown as "Lost/Stolen" and "Deactivated". The "Spare Credit Card" is also shown from the front side with basic identification information such as, a card number, name (card holder) and validity date as shown and described in FIG. 1. The "Spare Credit card" is "Activated" as shown in FIG. 4.

Referring again to FIG. 4, once the customer (card holder) reports his/her "Lost/Stolen" credit card (Main Credit Card) to the credit card provider as described and shown in FIG. 3, the credit card company blocks (Deactivates) the first credit card number (main credit card) and activates the second credit card number "spare credit card", to be used as the main credit card.

If the credit card provider has decided to place a sticker on the "spare credit card" as the distinguishing factor between the two credit cards ("Main Credit Card" and "Spare Credit Card"), then the customer will simply remove the sticker from the "spare credit card" and use the "spare credit card" as the main credit card "main credit card". As mentioned under "Differentiation of Main and Spare Credit Cards", the distinguishable factors used for the two credit cards ("Main" and "Spare") can be a sticker, color, name or any other means.

Depending on the company policy, as described and shown in FIG. 1, the Personal Identification number (PIN) used for the old "Spare Credit Card" which is now the "Main Credit Card" can be the same Personal Identification number (PIN), or a different Personal Identification number (PIN) can be allocated.

Now the customer can use the "Spare Credit Card" as the "Main Credit Card".

Figure 5:
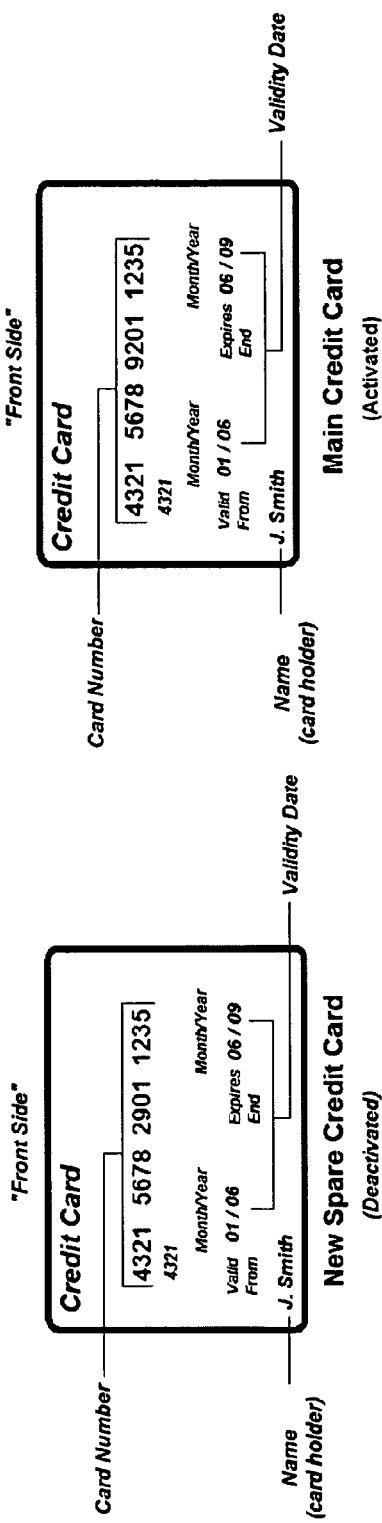
FIG. 5 is a front side view of the two credit cards. A "New Spare Credit Card" showing new card number with the same name and validity date and the old "Spare credit card" which is now used as the "Main Credit Card". The "New Spare Credit Card" is shown as "Deactivated" and the "Main Credit Card" (Old Spare Credit Card) is shown as "Activated".

Referring to FIG. 5, the "New Spare Credit Card" is shown from the front side, with a new card number, but with the same validity date (depending on the credit card company policy the validity date can remain the same or can be changed). The "Spare Credit Card" which is now used as the "Main Credit Card" is also shown from the front side with the same card number and validity date as shown in FIGS. 1 and 4. The "New Spare Credit Card" is "Deactivated" and the "Main Credit Card" (Old Spare Credit Card) is "Activated".

Referring again to FIG. 5, after the customer (card holder) reports his/her "Lost/Stolen" credit card (Main Credit Card) to the credit card provider as described and shown in FIGS. 3 and 4, the credit card company will then replace the blocked (deactivated) credit card number (first credit card number) with a new number and will send a new credit card (New Spare Credit Card) to the customer. The new credit card (New Spare Credit Card) will remain "deactivated".

The credit card (New Spare Credit Card) sent to the customer will be distinguished from the "Main Credit Card" (Old Spare credit card), in-order for the customer not to carry and use the wrong credit card (New Spare credit card) which is "deactivated". As mentioned under "Differentiation of Main and Spare Credit Cards", the distinguishable factors used for the two credit cards ("Main" and "Spare") can be a sticker, color, name or any other means.

Depending on the company policy, as described and shown in FIGS. 1 and 4, the Personal Identification number (PIN) to be used for the "New Spare Credit Card" can be the same Personal Identification number (PIN), or a different Personal Identification number (PIN) can be allocated.

Upon receipt of the new credit card (New Spare Credit Card), the customer will call the credit card provider to confirm that he/she has received the new credit card (New Spare Credit Card).

Now the customer can use the "old Spare Credit Card" as the "Main Credit Card" and keep the "New Spare Credit Card" which is "Deactivated" in a separate and safe place, as shown and described in FIG. 1

After the validity dates on the two credit cards ("Main Credit Card" and "Spare Credit Card") have expired, the credit card provider will issue and send two new credit cards ("Main Credit Card" and "Spare Credit Card") to the customer.

Option 1

Summary

The credit card company opens One account with two different credit card numbers for each customer.

When the credit card is lost/stolen, the customer uses the credit card (Spare Credit Card) until a new credit card (New Main credit Card) is issued and sent to the customer.

Upon receipt of the package, the customer will call the Credit card provider to inform them that he/she has received the new credit card (New Main Credit Card). Then the Credit card provider will activate the new credit card number (New Main Credit Card) and will block (Deactivate) the second credit card number (spare credit card). The "Spare Credit Card" will be "Deactivated".

The customer can now use the new credit card (New Main Credit Card) and keep the credit card (Spare Credit Card) which is "Deactivated" in a separate and safe place. The "Spare Credit Card" does not get replaced.

In this specification the term "credit card" refers to credit cards (Master Card®, Visa®, Diners Club®, etc.) as well as charge cards (e.g., American Express®, some department store cards), debit cards such as usable at ATMs and many other locations or that are associated with a particular account, and hybrids thereof (e.g., extended payment American Express®, bank debit cards with the Visa® logo, etc.).

Referring to FIG. 1, two credit cards are shown from the front side, (Main Credit Card) and (Spare Credit Card) with basic identification information such as, a card number, name (card holder) and validity date. Both terms "Main Credit Card" and "Spare Credit Card" refer to credit cards as generally understood, namely, that which are allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

The credit card (Main Credit Card) will be "Activated" as soon as the customer confirms the receipt of both credit cards "Main Credit Card" and "Spare Credit Card" to the Credit card provider. The credit card "Spare Credit Card" will remain "Deactivated" as shown in FIG. 1.

The two credit cards ("Main Credit Card" and "Spare Credit Card") should be distinguished from one another, in order for the customer not to carry the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1 the sticker on the "spare credit card" will never be removed.

Referring again to FIG. 1, The credit card provider will open one account with two different card numbers, first card number for the "main credit card" and second card number for the "spare credit card". Then the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the "Main Credit Card". The "Spare Credit Card" will remain "Deactivated".

The credit card company (Credit card provider) will also provide one Personal Identification number (PIN) for both credit cards or, two different Personal Identification number (PIN) allocated to each one of the credit cards, according to the credit card company policy.

After the completion of this process, the customer will be instructed to carry and use only the "Main Credit Card" which is "Activated" and keep the "Spare Credit Card" which is "Deactivated" in a separate and safe place, such as at home. In case the customer is traveling out of town, again the customer should keep the credit card (Spare Credit Card) which is "Deactivated" in a separate and safe place, such as the hotel room or any place he/she is residing at that time. The customer should never carry both credit cards together.

After the validity dates on the two credit cards ("Main Credit Card" and "Spare Credit Card") have expired, the credit card provider will issue and send two new credit cards "Main Credit Card" and "Spare Credit Card" for the customer.

If the customer already has a credit card, then the credit card company will add an additional new card number to the existing credit card account, to be used as the second credit card number (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1 the sticker on the "spare credit card" will never be removed.

Referring to FIG. 2, the same two credit cards are shown from the back side, (Main Credit Card) and (Spare Credit Card) with basic information such as, card holder signature space and customer service contact numbers. The credit card (Main Credit Card) will be "Activated" as soon as the customer confirms the receipt of both credit cards ("Main Credit Card" and "Spare Credit Card") to the Credit card provider as shown and described in FIG. 1. The credit card "Spare Credit Card" will remain "Deactivated".

If the customer already has a credit card, then the credit card company will add an additional new card number to the existing credit card account, to be used as the second credit card number (spare credit card). The customer confirms the receipt of the credit "Spare Credit Card" to the Credit card provider as shown and described in FIG. 1. The credit card (Spare Credit Card) will remain "Deactivated".

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1 the sticker on the "spare credit card" will never be removed.

Referring to FIG. 3, the credit card (Main Credit Card) is shown as "Lost/Stolen". The "Spare Credit Card" is shown from back side as described and shown in FIG. 2. The customer service contact numbers are listed on the back side of the "Spare Credit Card" as shown and described in FIG. 2 and FIG. 3. The "Spare Credit Card" remains "Deactivated".

Referring again to FIG. 3, the customer (card holder) calls the listed customer service contact numbers on the back side of the "Spare Credit Card" to report his/her "Lost/Stolen" credit card (Main Credit Card). For security check, the credit card provider will ask the customer (card holder) to provide information such as, name, validity date, card number, PIN number, etc. Because both credit cards ("Main Credit Card" and "Spare Credit Card") are issued to one person, then the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 4, the credit card (Main Credit Card) is shown as "Lost/Stolen" and "Deactivated". The "Spare Credit Card" is also shown from the front side with basic identification information such as, a card number, name (card holder) and validity date as shown and described in FIG. 1. The "Spare Credit card" is "Activated" as shown in FIG. 4.

Referring again to FIG. 4, once the customer (card holder) reports his/her "Lost/Stolen" credit card (Main Credit Card) to the credit card provider as described and shown in FIG. 3, the credit card company blocks (Deactivates) the first credit card number (main credit card) and activates the second credit card number (spare credit card), to be used as the spare credit card (spare credit card).

The Personal Identification number (PIN) to be used for the credit card (Spare Credit Card) can be the same Personal Identification number (PIN), or a different Personal Identification number (PIN) can be allocated, depending on the company policy, as described and shown in FIG. 1.

Now the customer can use the credit card (Spare Credit Card) until a new credit card (New Main credit Card) is issued and sent to the customer.

Figure 5A:
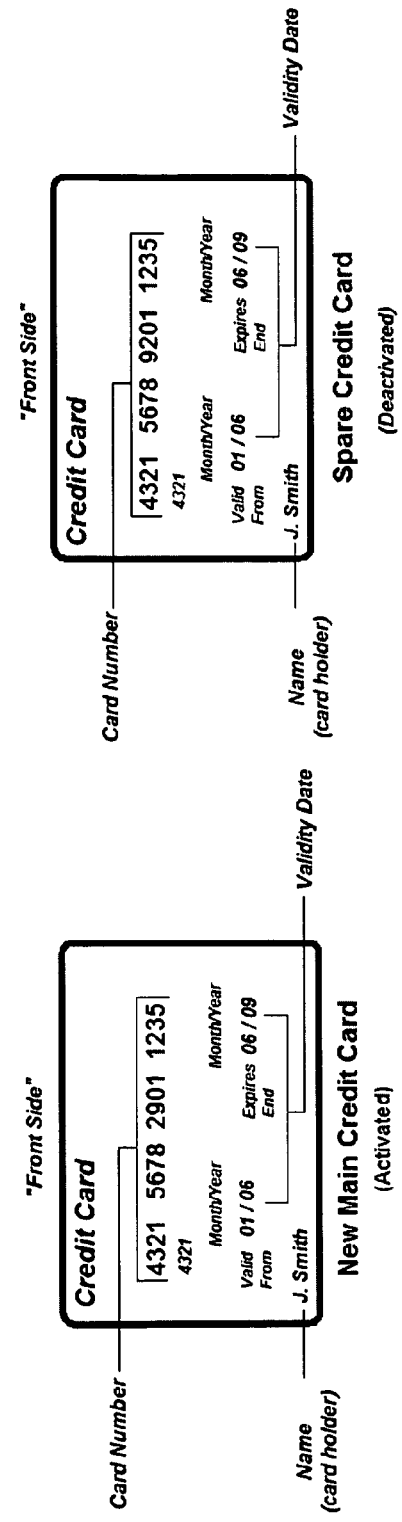
FIG. 5A is a front side view of the two credit cards. A "New Main Credit Card" showing new card number with the same name and validity date and a "Spare Credit Card" with the same credit card number, name and validity date as shown in FIG. 1. The "New Main Credit Card" is shown as "Activated" and the "Spare Credit Card" is shown as "Deactivated".

Referring to FIG. 5A, the new credit card (New Main Credit Card) is shown from the front side, with a new card number, but with the same validity date (the validity date can remain the same or can be changed according to the credit card company policy). The "Spare Credit Card" is also shown from the front side with the same card number and validity date as shown in FIGS. 1 and 4. The new credit card (New Main Credit Card) is "Activated" and the "Spare Credit Card" is "Deactivated".

Referring again to FIG. 5A, after the customer (card holder) reports his/her "Lost/Stolen" credit card (Main Credit Card) to the credit card provider as described and shown in FIGS. 3 and 4, the credit card company will then replace the blocked (Deactivated) credit card number (first credit card number) with a new number and will send a new credit card (New Main Credit Card) to the customer.

Upon receipt of the package, the customer will call the Credit card provider to inform them that he/she has received the new credit card (New Main Credit Card). Then the Credit card provider will activate the new credit card number (New Main Credit Card) and will block (Deactivate) the second credit card number (spare credit card). The "Spare Credit Card" will be "Deactivated".

The Personal Identification number (PIN) to be used for the new credit card (New Main Credit Card) can be the same Personal Identification number (PIN), or a different Personal Identification number (PIN) can be allocated, depending on the company policy, as described and shown in FIGS. 1 and 4.

Now the customer can use the new credit card (New Main Credit Card) and keep the credit card (Spare Credit Card) which is "Deactivated" in a separate and safe place, as shown and described in FIG. 1

After the validity dates on the two credit cards ("Main Credit Card" and "Spare Credit Card") have expired, the credit card provider will issue and send two new credit cards ("Main Credit Card" and "Spare Credit Card") for the customer.

Option 1A

Summary

The credit card company opens One account with two different credit card numbers for each customer.

When the credit card is lost/stolen, the customer uses the credit card (Spare Credit Card) until two new credit cards (New Main Credit Card and New Spare Credit Card) are issued and sent to the customer.

Upon receipt of the package, the customer will call the credit card provider to inform them that he/she has received the two new credit cards. Then the Credit card provider will activate the (New Main Credit Card) and will block (Deactivate) the (Old spare credit card). The "New Spare Credit Card" will remain "Deactivated".

The customer (card holder) will be asked to destroy the "Old Spare Credit Card" and keep the "New Spare Credit Card" which is "Deactivated", in a separate and safe place.

The Credit card provider sends two new credit cards to the customer, a "New Main Credit Card" and a "New Spare Credit Card".

Figure 6:
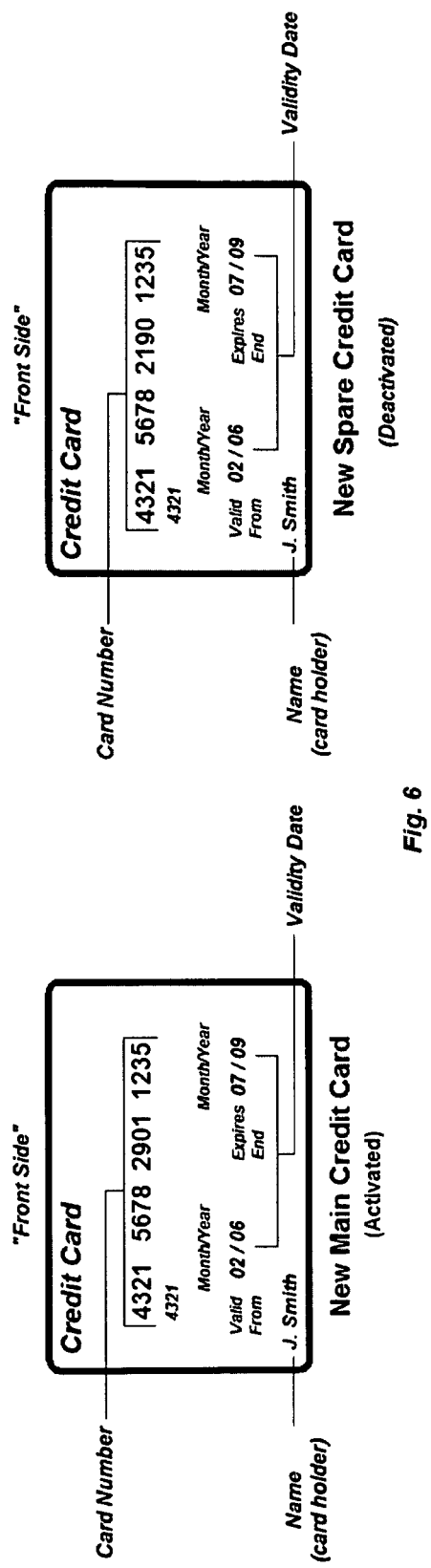
FIG. 6 is a front side view of the two credit cards. A "New Main Credit Card" showing new card number with same name and new validity date and a "New Spare Credit Card" with new credit card number, name and new validity date. The "New Main Credit Card" is shown as "Activated" and the "New Spare Credit Card" is shown as "Deactivated".

Referring to FIG. 6, the new credit card (New Main Credit Card) is shown from the front side, with a new card number and a new validity date. A new credit card (New Spare Credit Card) is also shown from the front side with a new card number and a new validity date. The new credit card (New Main Credit Card) is "Activated" and the new credit card (New Spare Credit Card) is "Deactivated".

Referring again to FIG. 6, after the customer (card holder) reports his/her "Lost/Stolen" credit card (Main Credit Card) to the credit card provider as described and shown in FIGS. 3 and 4, the Credit card provider will send a package with two new cards to the customer, a "New Main Credit Card" and a "New Spare Credit Card".

Upon receipt of the package, the customer will call the Credit card provider to inform them that he/she has received the two new credit cards. Then the Credit card provider will activate the first new credit card number (New Main Credit Card) and will block (Deactivate) the second credit card number (Old spare credit card). The "New Spare Credit Card" will be "Deactivated".

The customer (card holder) will be asked to destroy the "Old Spare Credit Card" and keep the "New Spare Credit Card" which is "Deactivated", in a separate and safe place, as shown and described in FIG. 1.

This option provides the customer with a feature in which the Credit card provider sends two new credit cards to the customer, a "New Main Credit Card" and a "New Spare Credit Card". The validity dates on both credit cards can remain the same or can be changed according to the credit card company policy.

After the validity dates on the two credit cards ("Main Credit Card" and "Spare Credit Card") have expired, the credit card provider will issue and send two new credit cards "Main Credit Card" and "Spare Credit Card" for the customer.

Option 1B

Summary

The credit card company opens One account with two different credit card numbers for each customer.

When the credit card is lost/stolen, the customer uses the credit card (Spare Credit Card) which has no validity date, until a new credit card (Main Credit Card) is issued and sent to the customer.

Upon receipt of the package, the customer will call the Credit card provider to inform them that he/she has received the new credit card (New Main Credit Card). Then the Credit card provider will activate the "New Main Credit Card" and will block (Deactivate) the "spare credit card".

The customer can now use the new credit card (New Main Credit Card) and keep the "Spare Credit Card" which is "Deactivated" in a separate and safe place.

The "Spare Credit Card" which has no validity date, allows the customer to use the "Spare Credit Card" without receiving a new "Spare Credit Card" from the credit card provider. The customer will only receive a new "Main Credit Card" when the credit card (Main Credit Card) is lost/stolen or the validity date on the credit card "Main Credit Card" has expired.

Figure 7:
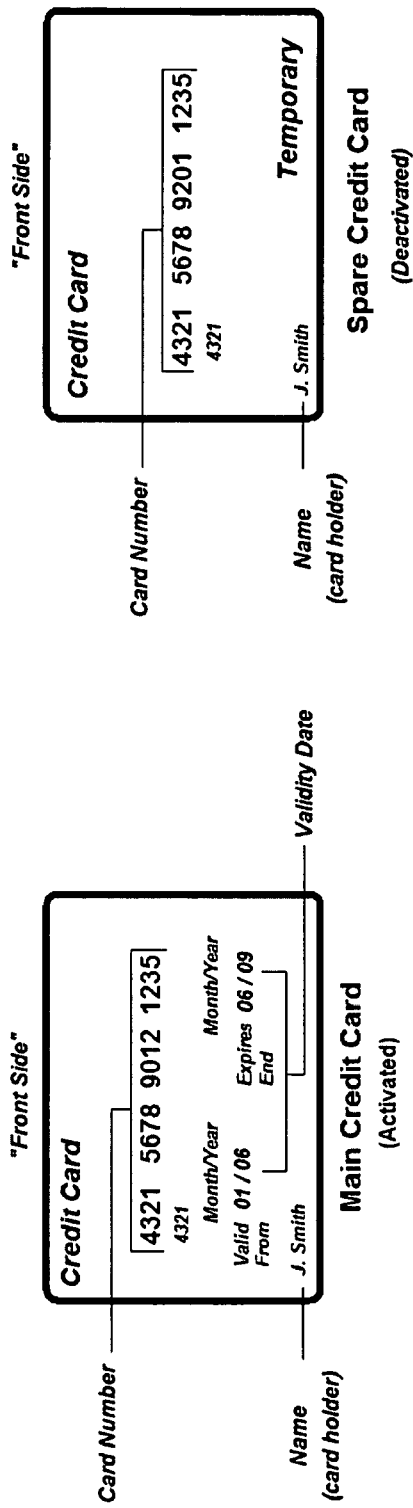
FIG. 7 is a front side view of the two credit cards. A "Main Credit Card" showing credit card number with the same name and validity date, and a "Spare Credit Card" with a different credit card number, the same name but without validity date. The "Main Credit Card" is shown as "Activated" and the "Spare Credit Card" called "Temporary" is shown as "Deactivated".

Referring to FIG. 7, the two credit cards are shown from the front side, (Main Credit Card) and (Spare Credit Card). The credit card (Main Credit Card) is issued with the basic identification information such as, a card number, name (card holder) and validity date. The "Spare Credit Card" has no validity date, but is issued with the basic identification information such as, a card number, name (card holder). Both terms "Main Credit Card" and "Spare Credit Card" refer to a credit card as generally understood, namely, that which is allocated by the credit card provider to the customer. Each credit card has a different card number, but the name of the card holder on both cards are the same. Because each credit card company (credit card provider) has a different card numbering system, the structures of both credit card numbers vary depending on the credit card company system.

The credit card (Main Credit Card) will be "Activated" as soon as the customer confirms the receipt of both credit cards ("Main Credit Card" and "Spare Credit Card") to the Credit card provider. The "Spare Credit Card" will remain "Deactivated" as shown in FIG. 7.

The two credit cards ("Main credit card" and "Spare Credit Card") will be distinguished from one another in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1B the sticker on the "spare credit card" will never be removed.

Referring again to FIG. 7, the credit card provider will open one account with two different card numbers, first card number for the "main credit card" and second card number for the "spare credit card". Then the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the credit card "Main Credit Card". The credit card "Spare Credit Card" will remain "Deactivated".

The card company (Credit card provider) will also provide one Personal Identification number (PIN) allocated to both credit cards or two different Personal Identification numbers (PIN) allocated to each one of the credit cards, depending on the company policy.

After the completion of this process, the customer will be instructed to carry and use only the "Main Credit Card" which is "Activated" and keep the "Spare Credit Card" which is "Deactivated" in a separate place, for example, at home. In case the customer is traveling out of town, again the customer should keep the "Spare Credit Card" which is "Deactivated" in a separate place, such as the hotel room or any place he/she is residing at that time. The customer should never carry both credit cards together.

If the customer already has a credit card, then the credit card company will add an additional new card number to the existing credit card account, to be used as the second credit card number (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1B the sticker on the "spare credit card" will never be removed.

Figure 8:
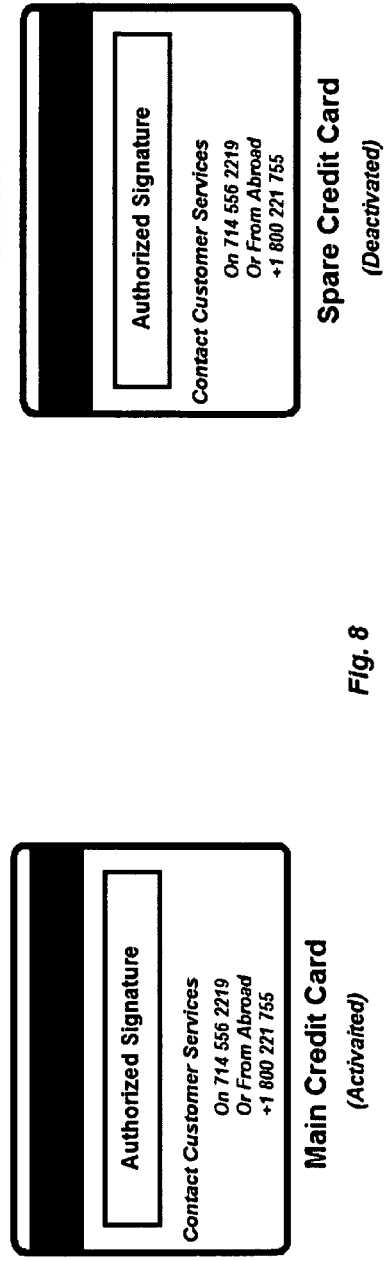
FIG. 8 is a back side view of the two credit cards, "Main Credit Card" and "Spare Credit Card" showing card holder signature space and customer service contact numbers. The "Main Credit Card" is shown as "Activated" and the "Spare Credit Card" is shown as "Deactivated".

Referring to FIG. 8, the same two credit cards are shown from the back side, ("Main Credit Card" and "Spare Credit Card") with basic information such as, card holder signature space and customer service contact numbers. The credit card (Main credit Card) will be "Activated" as soon as the customer confirms the receipt of both credit cards "Main Credit Card" and "Spare Credit Card" to the Credit card provider as shown and described in FIG. 7. The credit card "Spare Credit Card" will remain "Deactivated".

If the customer already has a credit card, then the credit card company will add an additional new card number to the existing credit card account, to be used as the second credit card number (spare credit card). The customer confirms the receipt of the credit card (Spare Credit Card) to the Credit card provider as shown and described in FIG. 7. The credit card "Spare Credit Card" will remain "Deactivated".

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 1B the sticker on the "spare credit card" will never be removed.

Figure 9:
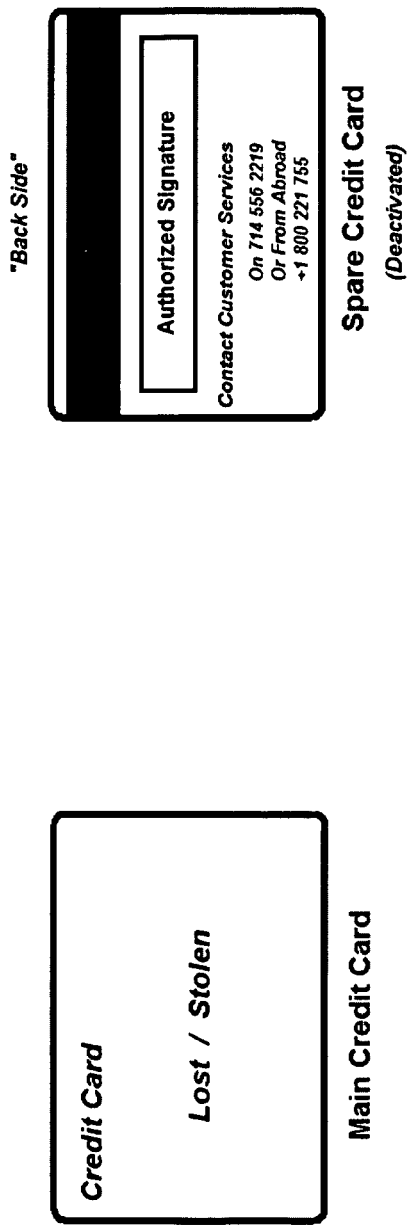
FIG. 9 is a front side view of the credit card (Main Credit Card) shown as "Lost/Stolen" and a back side view of the credit card (Spare Credit Card) showing card holder signature space and customer service contact numbers. Credit card (Spare Credit Card) is shown as "Deactivated".

Referring to FIG. 9, the credit card (Main Credit Card) is shown as "Lost/Stolen". The "Spare Credit Card" is shown from back side as described and shown in FIG. 8. The customer service contact numbers are listed on the back side of the "Spare Credit Card" as shown and described in FIG. 8 and FIG. 9. The "Spare Credit Card" remains "Deactivated".

Referring again to FIG. 9, the customer (card holder) calls the listed customer service contact numbers on the back side of the "Spare credit Card" to report his/her "Lost/Stolen" credit card (Main Credit Card). For security check, the credit card provider will ask the customer (card holder) to provide information such as, name, validity date, card number, PIN number, etc. Since both credit cards ("Main credit Card" and "Spare Credit Card") are issued to one person, the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Figure 10:
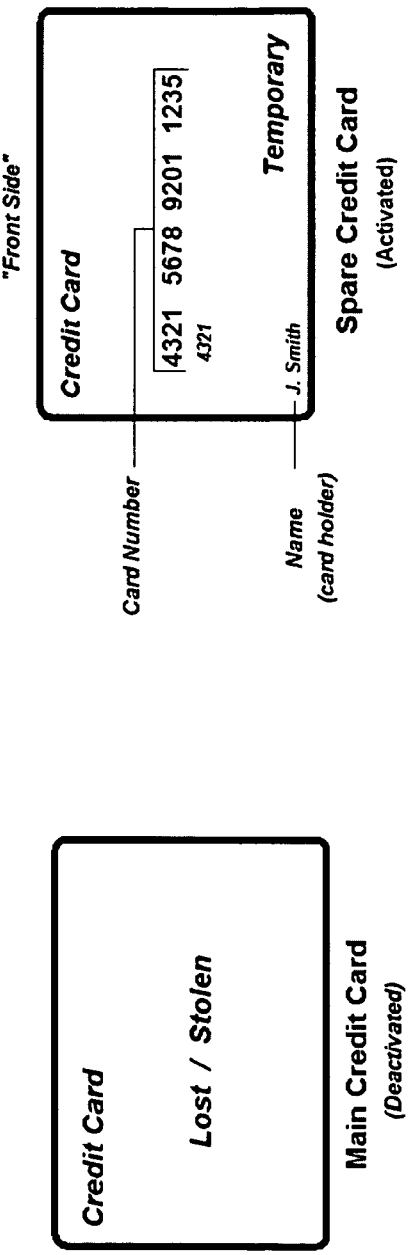
FIG. 10 is a front side view of the "Main Credit Card" shown as "Lost/Stolen" and a front side view of the "Spare Credit Card" showing the same name (card holder), credit card number, but without validity date as shown in FIG. 7. The "Spare Credit Card" is called "temporary" and is shown as "Activated".

Referring to FIG. 10, the credit card (Main Credit Card) is shown as "Lost/Stolen" and "Deactivated". The "Spare Credit Card" is also shown from the front side without a validity date, but has the basic identification information such as, a card number, name (card holder) as shown and described in FIG. 7. The "Spare Credit Card" is "Activated" as shown in FIG. 10.

Referring again to FIG. 10, once the customer (card holder) reports his/her "Lost/Stolen" credit card (Main Credit Card) to the credit card provider as described and shown in FIG. 9, the credit card company blocks (Deactivates) the first credit card number (main credit card) and activates the second credit card number "spare credit card", to be used as the spare credit card (spare credit card).

The Personal Identification number (PIN) to be used for the "Spare Credit Card" can be the same Personal Identification number (PIN), or a different Personal Identification number (PIN) can be allocated, depending on the company policy, as described and shown in FIG. 7.

Now the customer can use the "Spare Credit Card" until a new credit card (Main Credit Card) is issued and sent to the customer.

Figure 11:
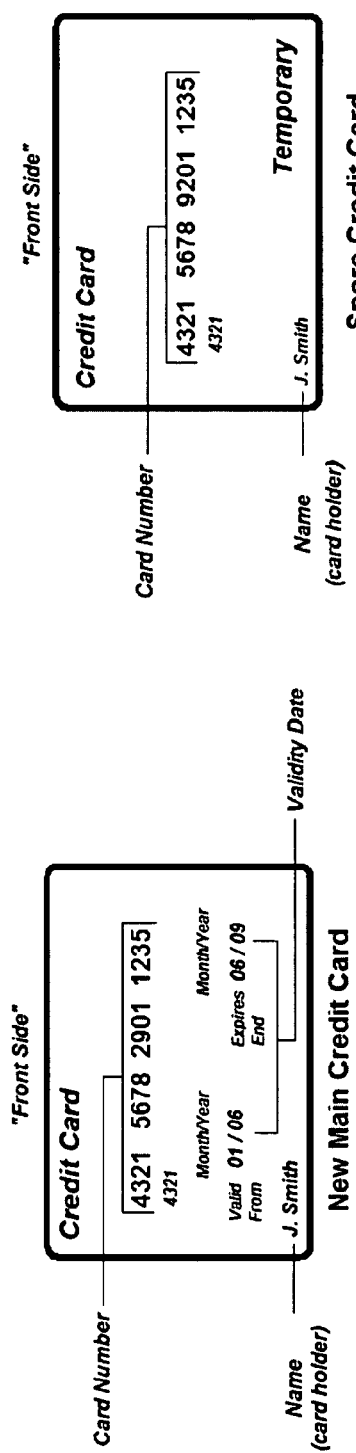
FIG. 11 is a front side view of the two credit cards. A "New Main Credit Card" showing new card number with the same name and validity date and a "Spare Credit Card" with the same credit card number, same name, but without validity date as shown in FIG. 7. The "New Main Credit Card" is shown as "Activated" and the "Spare Credit Card" is called "Temporary" and shown as "Deactivated".

Referring to FIG. 11, the new credit card (New Main Credit Card) is shown from the front side, with a new card number, but with the same validity date (the validity date can remain the same or can be changed according to the credit card company policy). The "Spare Credit Card" is also shown from the front side with the same card number but without a validity date as shown in FIGS. 7 and 10. The new credit card (New Main Credit Card) is "Activated" and the "Spare Credit Card" is "Deactivated".

Referring again to FIG. 11, after the customer (card holder) reports his/her "Lost/Stolen" credit card (Main Credit Card) to the credit card provider as described and shown in FIGS. 9 and 10, The credit card company will then replace the blocked (Deactivated) credit card number (first credit card number) with a new number and will send a new credit card (New Main Credit Card) to the customer.

Upon receipt of the package, the customer will call the Credit card provider to inform them that he/she has received the new credit card (New Main Credit Card). Then the Credit card provider will activate the first new credit card number (New Main Credit Card) and will block (Deactivate) the second credit card number (spare credit card). The "Spare Credit Card" will be "Deactivated".

The Personal Identification number (PIN) to be used for the new credit card "New main Credit Card" can be the same Personal Identification number (PIN), or a different Personal Identification number (PIN) can be allocated, depending on the company policy, as described and shown in FIGS. 7 and 10.

Now the customer can use the new credit card (New Main Credit Card) and keep the "Spare Credit Card" which is "Deactivated" in a separate and safe place, as shown and described in FIG. 7

This option provides the customer with a feature in which the "Spare Credit Card" has no validity date. This option has the advantage where the customer can always keep the "Spare Credit Card" without receiving a new "Spare Credit Card" from the credit card provider. The customer will only receive a new "Main Credit Card" when the credit card (Main Credit Card) is lost/stolen or the validity date on the credit card "Main Credit Card" has expired.

After the validity date on the credit card (Main Credit Card) has expired, the credit card provider will issue and send a new credit card (Main Credit Card) for the customer.

Figure 12:
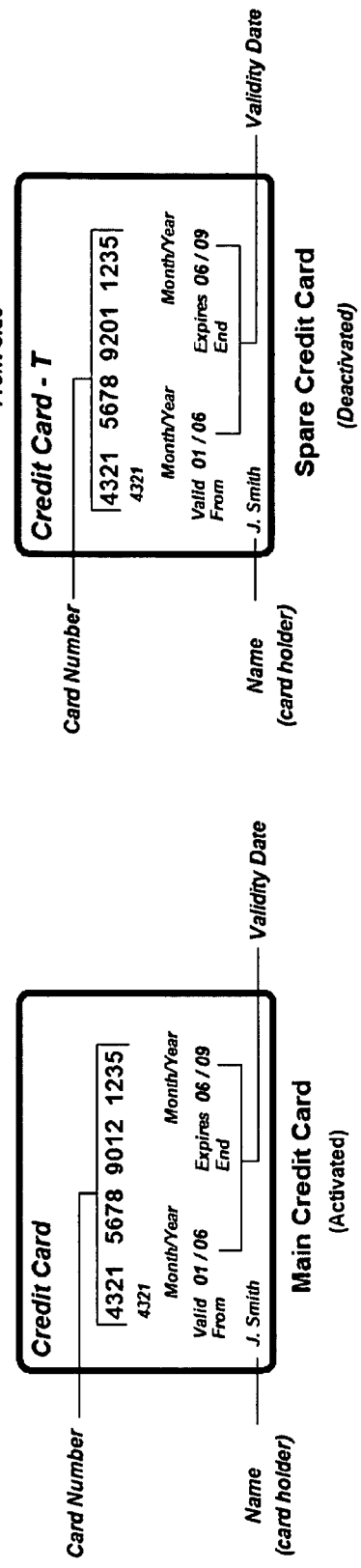
FIG. 12 is a front side view of the two credit cards, ("Main Credit Card" and "Spare Credit Card") showing the same name (card holder) and validity date but with different card numbers. The "Main Credit Card" is called the "credit card" and the "Spare Credit Card" is called the "credit card-T". The "Main Credit Card" is shown as "Activated" and the "Spare Credit Card" is shown as "Deactivated".

Referring to FIG. 12, two credit cards are shown from the front side, (Main Credit Card and Spare Credit Card) with basic identification information such as, a card number, name (card holder) and validity date. Both terms ("Main Credit Card" and "Spare Credit Card") refer to a credit card as generally understood, namely, that which is allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

In-order to distinguish the two credit cards (Main Credit Card and Spare Credit Card) from each other, the credit card "Main Credit Card" is named as "Credit Card" and the "Spare Credit Card" is named as "Credit Card-T". This feature also applies to FIGS. 1, 4, 5, 5A and 6

Option 2

Summary

The credit card company opens Two accounts with two different card numbers, first account for the "main credit card" and second account for the "spare credit card".

When the customer reports his/her lost or stolen credit card to the company, then the credit card company blocks (Deactivates) the first account (main credit card) and transfers the whole account (balance of credit) in the main credit card into the "spare credit card" and the "spare credit card" is activated to be used as the main credit card.

The credit card company will then replace the blocked (deactivated) first account with a new account and will send a new credit card (New Spare Credit Card) for the customer. The new credit card (New Spare Credit Card) will remain "deactivated".

The credit card company opens two accounts with two different card numbers, first account for the "main credit card" and second account for the "spare credit card". Then the credit card company provides the customer with two credit cards, a "main credit card" and a "spare credit card". The "main credit card" will be the master credit card and will function identically as the existing credit cards. The "spare credit card" will also function identical to the existing credit cards, but will be "activated" for use, only when the "main credit card" is reported as lost or stolen by the customer to the credit card company. Both credit cards will never be activated at the same time. The credit card company will only "activate" the master card "main credit card" after receiving confirmation from the customer that he/she has received the two credit cards. The "spare credit card" will remain "deactivated".

When the customer reports his/her lost or stolen credit card to the company, then the credit card company blocks (Deactivates) the first account (main credit card) and transfers the whole account (balance of credit) in the master card (main credit card) into the "spare credit card" and the "spare credit card" is activated to be used as the master credit card (main credit card). The credit card company will then replace the blocked (deactivated) first account with a new account (or reactivate the first account) and will send a new credit card (New Spare Credit Card) for the customer. The new credit card (New Spare Credit Card) will remain "deactivated".

The "deactivated" credit card (spare credit card) which will only be "activated" for use when the master credit card (main credit card) is reported as lost/stolen, should always be kept in a separate place. The two credit cards ("main credit card" and "spare credit card") should never be carried together.

The two credit cards ("Main Credit Card" and "Spare Credit Card") should be distinguished from one another, in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

If the customer already has a credit card, then the credit card company will open an additional new card account with a new card number, to be used as the second account (spare credit card). After receiving confirmation from the customer that he/she has received the "Spare Credit Card", the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

Referring to FIG. 1, two credit cards are shown from the front side, ("Main Credit Card" and "Spare Credit Card") with basic identification information such as, a card number, name (card holder) and validity date. Both terms "Main Credit Card" and "Spare Credit Card" refer to credit cards as generally understood, namely, that which are allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

The credit card (Main Credit Card) will be "Activated" as soon as the customer confirms the receipt of both credit cards "Main Credit Card" and "Spare Credit Card" to the Credit card provider. The credit card "Spare Credit Card" will remain "Deactivated" as shown in FIG. 1.

Referring again to FIG. 1, the credit card provider will open two accounts with two different card numbers, first account for the "main credit card" and second account for the "spare credit card". Then the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the "Main Credit Card". The "Spare Credit Card" will remain "Deactivated".

The two credit cards ("Main Credit Card" and "Spare Credit Card") should be distinguished from one another, in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

According to the company policy the credit card company (Credit card provider) will either provide one Personal Identification number (PIN) for both credit cards or two different Personal Identification numbers (PIN) allocated to each one of the credit cards.

After the completion of this process, the customer will be instructed to carry and use only the "Main Credit Card" which is "Activated" and keep the "Spare Credit Card" which is "Deactivated" in a separate and safe place, such as at home. In case the customer is traveling out of town, again the customer should keep the credit card (Spare Credit Card) which is "Deactivated" in a separate and safe place, such as the hotel room or any place he/she is residing at that time. The customer should never carry both credit cards together.

After the validity dates on the two credit cards ("Main Credit Card" and "Spare Credit Card") have expired, the credit card provider will issue and send two new credit cards "Main Credit Card" and "Spare Credit Card" for the customer.

If the customer already has a credit card, then the credit card company will open an additional new card account with a new card number, to be used as the second account (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

Referring to FIG. 2, the same two credit cards are shown from the back side, ("Main Credit Card" and "Spare Credit Card") with basic information such as, card holder signature space and customer service contact numbers. The Main Credit Card will be "Activated" as soon as the customer confirms the receipt of both credit cards ("Main Credit Card" and "Spare Credit Card") to the Credit card provider as shown and described in FIG. 1. The "Spare Credit Card" will remain "Deactivated".

If the customer already has a credit card, then the credit card company will open an additional new card account with a new card number, to be used as the second account (spare credit card). The customer confirms the receipt of the "Spare Credit Card" to the credit card provider as shown and described in FIG. 1. The "Spare Credit Card" will remain "Deactivated".

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means.

Referring to FIG. 3, the Main Credit Card is shown as "Lost/Stolen". The Spare Credit Card is shown from back side as described and shown in FIG. 2. The customer service contact numbers are listed on the back side of the "Spare Credit Card" as shown and described in FIG. 2 and FIG. 3. The "Spare Credit Card" remains "Deactivated".

Referring again to FIG. 3, the customer (card holder) calls the listed customer service contact numbers on the back side of the "Spare Credit Card" to report his/her "Lost/Stolen" credit card (Main Credit Card). For security check, the credit card provider will ask the customer (card holder) to provide information such as, name, validity date, card number, PIN number, etc. Because both credit cards ("Main Credit Card" and "Spare Credit Card") are issued to one person, the first account number for the "main credit card" will display the second account number for the "spare credit card" and the second account number for the "spare credit card" will display the first account number for the "main credit card". Then the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 4, the Main Credit Card is shown as "Lost/Stolen" and "Deactivated". The "Spare Credit Card" is also shown from the front side with basic identification information such as, a card number, name (card holder) and validity date as shown and described in FIG. 1. The "Spare Credit card" is "Activated" as shown in FIG. 4.

Referring again to FIG. 4, once the customer (card holder) reports his/her "Lost/Stolen" credit card (Main Credit Card) to the credit card provider as described and shown in FIG. 3, the credit card company blocks (Deactivates) the first account (main credit card) and transfers the whole account (balance of credit) in the master card (main credit card) into the "spare credit card" and the "spare credit card" is activated to be used as the master credit card (main credit card).

If the credit card provider has decided to place a sticker on the "spare credit card" as the distinguishing factor between the two credit cards ("Main Credit Card" and "Spare Credit Card"), then the customer will simply remove the sticker from the "spare credit card" and use the "spare credit card" as the master credit card (main credit card). As mentioned under "Differentiation of Main and Spare Credit Cards", the distinguishable factors used for the two credit cards ("Main" and "Spare") can be a sticker, color, name or any other means.

Depending on the company policy, as described and shown in FIG. 1, the Personal Identification number (PIN) used for the old "Spare Credit Card" which is now the "Main Credit Card" can be the same Personal Identification number (PIN), or a different Personal Identification number (PIN) can be allocated.

Now the customer can use the "Spare Credit Card" as the "Main Credit Card".

Referring to FIG. 5, the "New Spare Credit Card" is shown from the front side, with a new card number, but with the same validity date (depending on the credit card company policy the validity date can remain the same or can be changed). The "Spare Credit Card" which is now used as the "Main Credit Card" is also shown from the front side with the same card number and validity date as shown in FIGS. 1 and 4. The "New Spare Credit Card" is "Deactivated" and the "Main Credit Card" (Old Spare Credit Card) is "Activated".

Referring again to FIG. 5, after the customer (card holder) reports his/her "Lost/Stolen" credit card (Main Credit Card) to the credit card provider as described and shown in FIGS. 3 and 4, the credit card company will then replace the blocked (Deactivated) first account with a new account (or reactivate the first account) and will send a new credit card (New Spare Credit Card) for the customer. The new credit card (New Spare Credit Card) will remain "deactivated".

The credit card "New Spare Credit Card" sent to the customer will be distinguished from the "Main Credit Card" (Old Spare Credit Card) in-order for the customer not to carry and use the wrong credit card (new spare credit card) which is "deactivated". As mentioned under "Differentiation of Main and Spare Credit Cards", the distinguishable factors used for the two credit cards ("Main" and "Spare") can be a sticker, color, name or any other means.

Depending on the company policy, as described and shown in FIGS. 1 and 4, the Personal Identification number (PIN) to be used for the "New Spare Credit Card" can be the same Personal Identification number (PIN), or a different Personal Identification number (PIN) can be allocated.

Upon receipt of the new credit card (New Spare Credit Card), the customer will call the credit card provider to confirm that he/she has received the new credit card (New Spare Credit Card).

Now the customer can use the old "Spare Credit Card" as the "Main Credit Card" and keep the "New Spare Credit Card" which is "Deactivated" in a separate and safe place, as shown and described in FIG. 1

After the validity dates on the two credit cards ("Main Credit Card" and "Spare Credit Card") have expired, the credit card provider will issue and send two new credit cards ("Main Credit Card" and "Spare Credit Card") for the customer.

Option 2A

Summary

The credit card company opens Two accounts with two different card numbers, first account for the "main credit card" and second account for the "spare credit card".

When the credit card is lost/stolen, the customer uses the credit card (Spare Credit Card) until a new credit card (New Main credit Card) is issued and sent to the customer.

Upon receipt of the package, the customer will call the Credit card provider to inform them that he/she has received the new credit card (New Main Credit Card). Then the Credit card provider will "Activate" the new credit card (New Main Credit Card) and will transfer the whole account (balance of credit) from the "Spare Credit Card" into the new credit card (New Main Credit Card). The "Spare Credit Card" will be "Deactivated".

The customer can now use the new credit card (New Main Credit Card) and keep the credit card (Spare Credit Card) which is "Deactivated" in a separate and safe place.

In this specification the term "credit card" refers to credit cards (Master Card®, Visa®, Diners Club®, etc.) as well as charge cards (e.g., American Express®, some department store cards), debit cards such as usable at ATMs and many other locations or that are associated with a particular account, and hybrids thereof (e.g., extended payment American Express®, bank debit cards with the Visa® logo, etc.).

Referring to FIG. 1, two credit cards are shown from the front side, (Main Credit Card) and (Spare Credit Card) with basic identification information such as, a card number, name (card holder) and validity date. Both terms "Main Credit Card" and "Spare Credit Card" refer to credit cards as generally understood, namely, that which are allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

The credit card (Main Credit Card) will be "Activated" as soon as the customer confirms the receipt of both credit cards "Main Credit Card" and "Spare Credit Card" to the Credit card provider. The credit card "Spare Credit Card" will remain "Deactivated" as shown in FIG. 1.

The two credit cards ("Main Credit Card" and "Spare Credit Card") should be distinguished from one another, in order for the customer not to carry the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 2A the sticker on the "spare credit card" will never be removed.

Referring again to FIG. 1, the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the "Main Credit Card". The "Spare Credit Card" will remain "Deactivated".

The credit card company (Credit card provider) will also provide one Personal Identification number (PIN) for both credit cards or, two different Personal Identification number (PIN) allocated to each one of the credit cards, according to the credit card company policy.

After the completion of this process, the customer will be instructed to carry and use only the "Main Credit Card" which is "Activated" and keep the "Spare Credit Card" which is "Deactivated" in a separate and safe place, such as at home. In case the customer is traveling out of town, again the customer should keep the credit card (Spare Credit Card) which is "Deactivated" in a separate and safe place, such as the hotel room or any place he/she is residing at that time. The customer should never carry both credit cards together.

After the validity dates on the two credit cards ("Main Credit Card" and "Spare Credit Card") have expired, the credit card provider will issue and send two new credit cards "Main Credit Card" and "Spare Credit Card" for the customer.

If the customer already has a credit card, then the credit card company will open a new account with a new card number, to be used as the second account (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 2A the sticker on the "spare credit card" will never be removed.

Referring to FIG. 2, the same two credit cards are shown from the back side, ("Main Credit Card" and "Spare Credit Card") with basic information such as, card holder signature space and customer service contact numbers. The credit card (Main Credit Card) will be "Activated" as soon as the customer confirms the receipt of both credit cards ("Main Credit Card" and "Spare Credit Card") to the Credit card provider as shown and described in FIG. 1. The credit card "Spare Credit Card" will remain "Deactivated".

If the customer already has a credit card, then the credit card company will open a new card account with a new card number, to be used as the second account (spare credit card). The customer confirms the receipt of the credit "Spare Credit Card" to the Credit card provider as shown and described in FIG. 1. The credit card "Spare Credit Card" will remain "Deactivated".

The "Spare Credit Card" sent to the customer will be distinguished from the "Main Credit Card", in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 2A the sticker on the "spare credit card" will never be removed.

Referring to FIG. 3, the credit card (Main Credit Card) is shown as "Lost/Stolen". The "Spare Credit Card" is shown from back side as described and shown in FIG. 2. The customer service contact numbers are listed on the back side of the "Spare Credit Card" as shown and described in FIG. 2 and FIG. 3. The "Spare Credit Card" remains "Deactivated".

Referring again to FIG. 3, the customer (card holder) calls the listed customer service contact numbers on the back side of the "Spare Credit Card" to report his/her "Lost/Stolen" credit card (Main Credit Card). For security check, the credit card provider will ask the customer (card holder) to provide information such as, name, validity date, card number, PIN number, etc. Because both credit cards ("Main Credit Card" and "Spare Credit Card") are issued to one person, the first account for the "main credit card" will display the second account for the "spare credit card" and the second account for the "spare credit card" will display the first account for the "main credit card". Then the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 4, the credit card (Main Credit Card) is shown as "Lost/Stolen" and "Deactivated". The "Spare Credit Card" is also shown from the front side with basic identification information such as, a card number, name (card holder) and validity date as shown and described in FIG. 1. The "Spare Credit card" is "Activated" as shown in FIG. 4.

Referring again to FIG. 4, once the customer (card holder) reports his/her "Lost/Stolen" credit card (Main Credit Card) to the credit card provider as described and shown in FIG. 3, the credit card company blocks (Deactivates) the first account (main credit card) and transfers the whole account (balance of credit) in the master card (main credit card) into the "spare credit card" account and the "Spare Credit Card" is "Activated".

The Personal Identification number (PIN) to be used for the credit card (Spare Credit Card) can be the same Personal Identification number (PIN), or a different Personal Identification number (PIN) can be allocated, depending on the company policy, as described and shown in FIG. 1.

Now the customer can use the credit card (Spare Credit Card) until a new credit card (New Main credit Card) is issued and sent to the customer.

Referring to FIG. 5A, the new credit card (New Main Credit Card) is shown from the front side, with a new card number, but with the same validity date (the validity date can remain the same or can be changed according to the credit card company policy). The "Spare Credit Card" is also shown from the front side with the same card number and validity date as shown in FIGS. 1 and 4. The new credit card (New Main Credit Card) is "Activated" and the "Spare Credit Card" is "Deactivated".

Referring again to FIG. 5A, after the customer (card holder) reports his/her "Lost/Stolen" credit card (Main Credit Card) to the credit card provider as described and shown in FIGS. 3 and 4, the credit card company will then replace the blocked (Deactivated) first account with a new account (or reactivated first account) and will send a new credit card (New Main Credit Card) to the customer.

Upon receipt of the package, the customer will call the Credit card provider to inform them that he/she has received the new credit card (New Main Credit Card). Then the Credit card provider will "Activate" the new credit card (New Main Credit Card) and will transfer the whole account (balance of credit) from the "Spare Credit Card" into the new credit card (New Main Credit Card). The "Spare Credit Card" will be "Deactivated".

The Personal Identification number (PIN) to be used for the new credit card (New main Credit Card) can be the same Personal Identification number (PIN), or a different Personal Identification number (PIN) can be allocated, depending on the company policy, as described and shown in FIGS. 1 and 4.

Now the customer can use the new credit card (New Main Credit Card) and keep the credit card (Spare Credit Card) which is "Deactivated" in a separate and safe place, as shown and described in FIG. 1

After the validity dates on the two credit cards ("Main Credit Card" and "Spare Credit Card") have expired, the credit card provider will issue and send two new credit cards ("Main Credit Card" and "Spare Credit Card") for the customer.

Option 2B
Summary

The credit card company opens Two accounts with two different card numbers, first account for the "main credit card" and second account for the "spare credit card".

When the credit card is lost/stolen, the customer uses the credit card (Spare Credit Card) until two new credit cards ("New Main Credit Card" and "New Spare Credit Card") are issued and sent to the customer.

Upon receipt of the package, the customer will call the Credit card provider to inform them that he/she has received the two new credit cards. Then the credit card provider will "Activate" the new credit card (New Main Credit Card) and will transfer the whole account (balance of credit) from the old credit card (Old Spare credit Card) into the new credit card (New Main Credit Card). The "New Spare Credit Card" will remain "Deactivated".

The customer (card holder) will be asked to destroy the "Old Spare Credit Card" and keep the "New Spare Credit Card" which is "Deactivated", in a separate and safe place.

The Credit card provider sends two new credit cards to the customer, a "New Main Credit Card" and a "New Spare Credit Card".

Referring to FIG. 6, the new credit card (New Main Credit Card) is shown from the front side, with a new card number and a new validity date. A new credit card (New Spare Credit Card) is also shown from the front side with a new card number and a new validity date. The new credit card (New Main Credit Card) is "Activated" and the new credit card (New Spare Credit Card) is "Deactivated".

Referring again to FIG. 6, after the customer (card holder) reports his/her "Lost/Stolen" credit card (Main Credit Card) to the credit card provider as described and shown in FIGS. 3 and 4, the Credit card provider will send a package with two new cards to the customer, a "New Main Credit Card" and a "New Spare Credit Card".

Upon receipt of the package, the customer will call the Credit card provider to inform them that he/she has received the two new credit cards. Then the credit card provider will "Activate" the new credit card (New Main Credit Card) and will transfer the whole account (balance of credit) from the old credit card (Old Spare credit Card) into the new credit card (New Main Credit Card). The "New Spare Credit Card" will be "Deactivated".

The customer (card holder) will be asked to destroy the "Old Spare Credit Card" and keep the "New Spare Credit Card" which is "Deactivated", in a separate and safe place, as shown and described in FIG. 1.

This option provides the customer with a feature in which the Credit card provider sends two new credit cards to the customer, a "New Main Credit Card" and a "New Spare Credit Card". The validity dates on both credit cards can remain the same or can be changed according to the credit card company policy.

After the validity dates on the two credit cards ("Main Credit Card" and "Spare Credit Card") have expired, the credit card provider will issue and send two new credit cards "Main Credit Card" and "Spare Credit Card" for the customer.

Option 2C
Summary

The credit card company opens Two accounts with two different card numbers, first account for the "main credit card" and second account for the "spare credit card".

When the credit card is lost/stolen, the customer uses the credit card (Spare Credit Card) which has no validity date, until a new credit card (Main Credit Card) is issued and sent to the customer.

Upon receipt of the package, the customer will call the Credit card provider to inform them that he/she has received the new credit card (New Main Credit Card). Then the Credit card provider will "Activate" the new credit card (New Main Credit Card) and will transfer the whole account (balance of credit) from the "Spare Credit Card" into the new credit card (New Main Credit Card). The "Spare Credit Card" will be "Deactivated".

The customer can use the new credit card (New Main Credit Card) and keep the "Spare Credit Card" which is "Deactivated" in a separate and safe place.

The "Spare Credit Card" has no validity date, allows the customer to use the "Spare Credit Card" without receiving a new "Spare Credit Card" from the credit card provider. The customer will only receive a new "Main Credit Card" when the credit card (Main Credit Card) is lost/stolen or the validity date on the credit card "Main Credit Card" has expired.

Referring to FIG. 7, the two credit cards are shown from the front side, (Main Credit Card) and (Spare Credit Card). The credit card "Main Credit Card" is issued with the basic identification information such as, a card number, name (card holder) and validity date. The credit card (Spare Credit Card) has no validity date, but is issued with the basic identification information such as, a card number, name (card holder). Both terms "Main Credit Card" and "Spare Credit Card" refer to a credit card as generally understood, namely, that which is allocated by the credit card provider to the customer. Each credit card has a different card number, but the name of the card holder on both cards are the same. Because each credit card company (credit card provider) has a different card numbering system, the structures of both credit card numbers vary depending on the credit card company system.

The credit card (Main Credit Card) will be "Activated" as soon as the customer confirms the receipt of both credit cards ("Main Credit Card" and "Spare Credit Card") to the Credit card provider. The "Spare Credit Card" will remain "Deactivated" as shown in FIG. 7.

The two credit cards ("Main Credit Card" and "Spare Credit Card") will be distinguished from one another, in-order for the customer not to carry and use the wrong credit card (spare credit card) which is "deactivated". As mentioned under "Differentiation of Main and Spare Credit Cards", the distinguishable factors used for the two credit cards ("Main" and "Spare") can be a sticker, color, name or any other means. In option 2C the sticker on the "spare credit card" will never be removed.

Referring again to FIG. 7, the Credit card provider will send a package with two credit cards to the customer, a "Main Credit Card" and a "Spare Credit Card". Upon receipt of the package, the customer will call the Credit card provider to inform them that he/she has received the two credit cards. Then the Credit card provider will "Activate" only the credit card "Main Credit Card". The credit card "Spare Credit Card" will remain "Deactivated".

The card company (Credit card provider) will also provide one Personal Identification number (PIN) allocated to both credit cards or two different Personal Identification numbers (PIN) allocated to each one of the credit cards, depending on the company policy.

After the completion of this process, the customer will be instructed to carry and use only the "Main Credit Card" which is "Activated" and keep the "Spare Credit Card" which is "Deactivated" in a separate place, for example, at home. In case the customer is traveling out of town, again the customer should keep the "Spare Credit Card" which is "Deactivated" in a separate place, such as the hotel room or any place he/she is residing at that time. The customer should never carry both credit cards together.

If the customer already has a credit card, then the credit card company will open a new account with a new card number, to be used as the second account (spare credit card). Upon receipt of the package, the customer will call the Credit card provider to inform them that he/she has received the "Spare Credit Card". Then the Credit card provider will instruct the customer to use the "Spare Credit Card" in the same manner as described above.

The "Spare Credit Card" sent to the customer will be distinguished from the "Main Credit Card", in-order for the customer not to carry and use the wrong credit card (spare credit card) which is "deactivated" As mentioned under "Differentiation of Main and Spare Credit Cards", the distinguishable factors used for the two credit cards ("Main" and "Spare") can be a sticker, color, name or any other means. In option 2C the sticker on the "spare credit card" will never be removed.

Referring to FIG. 8, the same two credit cards are shown from the back side, ("Main Credit Card" and "Spare Credit Card") with basic information such as, card holder signature space and customer service contact numbers. The credit card (Main credit Card) will be "Activated" as soon as the customer confirms the receipt of both credit cards "Main Credit Card" and "Spare Credit Card" to the Credit card provider as shown and described in FIG. 7. The credit card "Spare Credit Card" will remain "Deactivated".

If the customer already has a credit card, then the credit card company will open a new card account with a new card number, to be used as the second account (spare credit card). The customer confirms the receipt of the credit card (Spare Credit Card) to the Credit card provider as shown and described in FIG. 7. The credit card "Spare Credit Card" will remain "Deactivated".

The "Spare Credit Card" sent to the customer will be distinguished from the "Main Credit Card", in-order for the customer not to carry and use the wrong credit card ("pare credit card) which is "deactivated". As mentioned under "Differentiation of Main and Spare Credit Cards", the distinguishable factors used for the two credit cards ("Main" and "Spare") can be a sticker, color, name or any other means. In option 2C the sticker on the "spare credit card" will never be removed.

Referring to FIG. 9, the credit card (Main Credit Card) is shown as "Lost/Stolen". The "Spare Credit Card" is shown from back side as described and shown in FIG. 8. The customer service contact numbers are listed on the back side of the "Spare Credit Card" as shown and described in FIG. 8 and FIG. 9. The "Spare Credit Card" remains "Deactivated".

Referring again to FIG. 9, the customer (card holder) calls the listed customer service contact numbers on the back side of the "Spare credit Card" to report his/her "Lost/Stolen" credit card (Main Credit Card). For security check, the credit card provider will ask the customer (card holder) to provide information such as, name, validity date, card number, PIN number, etc. Since both credit cards ("Main credit Card" and "Spare Credit Card") are issued to one person, the first account for the "main credit card" will display the second account for the "spare credit card" and the second account for the "spare credit card" will display the first account for the "main credit card". Then the credit card provider will ask for the "Spare Credit Card" number in-order to block and "Deactivate" the Credit card (Main Credit Card). There is no need to keep a copy of the credit card (Main Credit Card) in case the credit card provider needs any information for blocking the credit card (Main Credit Card).

Referring to FIG. 10, the credit card (Main Credit Card) is shown as "Lost/Stolen" and "Deactivated". The "Spare Credit Card" is also shown from the front side without a validity date, but has the basic identification information such as, a card number, name (card holder) as shown and described in FIG. 7. The "Spare Credit Card" is "Activated" as shown in FIG. 10.

Referring again to FIG. 10, once the customer (card holder) reports his/her "Lost/Stolen" credit card (Main Credit Card) to the credit card provider as described and shown in FIG. 9, the credit card company blocks (Deactivates) the first account (main credit card) and transfers the whole account (balance of credit) in the master card (main credit card) into the "spare credit card" and the "Spare Credit Card" is "Activated".

The Personal Identification number (PIN) to be used for the "Spare Credit Card" can be the same Personal Identification number (PIN), or a different Personal Identification number (PIN) can be allocated, depending on the company policy, as described and shown in FIG. 7.

Now the customer can use the "Spare Credit Card" until a new credit card (Main Credit Card) is issued and sent to the customer.

Referring to FIG. 11, the new credit card (New Main Credit Card) is shown from the front side, with a new card number, but with the same validity date (the validity date can remain the same or can be changed according to the credit card company policy). The "Spare Credit Card" is also shown from the front side with the same card number but without a validity date as shown in FIGS. 7 and 10. The new credit card (New Main Credit Card) is "Activated" and the "Spare Credit Card" is "Deactivated".

Referring again to FIG. 11, after the customer (card holder) reports his/her "Lost/Stolen" credit card (Main Credit Card) to the credit card provider as described and shown in FIGS. 9 and 10, the credit card company will then replace the blocked (Deactivated) first account with a new account (or reactivate the first account) and will send a new credit card (New Main Credit Card) to the customer.

Upon receipt of the package, the customer will call the Credit card provider to inform them that he/she has received the new credit card (New Main Credit Card). Then the Credit card provider will "Activate" the new credit card (New Main Credit Card) and will transfer the whole account (balance of credit) from the "Spare Credit Card" into the new credit card (New Main Credit Card). The "Spare Credit Card" will be "Deactivated".

The Personal Identification number (PIN) to be used for the new credit card "New main Credit Card" can be the same Personal Identification number (PIN), or a different Personal Identification number (PIN) can be allocated, depending on the company policy, as described and shown in FIGS. 7 and 10.

Now the customer can use the new credit card (New Main Credit Card) and keep the "Spare Credit Card" which is "Deactivated" in a separate and safe place, as shown and described in FIG. 7

This option provides the customer with a feature in which the "Spare Credit Card" has no validity date. This option has the advantage where the customer can always keep the "Spare Credit Card" without receiving a new "Spare Credit Card" from the credit card provider. The customer will only receive a new "Main Credit Card" when the credit card (Main Credit Card) is lost/stolen or the validity date on the credit card "Main Credit Card" has expired.

After the validity date on the credit card (Main Credit Card) has expired, the credit card provider will issue and send a new credit card (Main Credit Card) for the customer.

Referring to FIG. 12, two credit cards are shown from the front side, (Main Credit Card and Spare Credit Card) with basic identification information such as, a card number, name (card holder) and validity date. Both terms ("Main Credit Card" and "Spare Credit Card") refer to a credit card as generally understood, namely, that which is allocated by the credit card provider to the customer. Each credit card has a different card number, but the name of the card holder and the validity dates on both cards are the same. Because each credit card company (credit card provider) has a different card numbering system, the structure of both credit card numbers vary depending on the credit card company system.

In-order to distinguish the two credit cards ("Main Credit Card" and "Spare Credit Card") from each other, the credit card "Main Credit Card" is named as "Credit Card" and the "Spare Credit Card" is named as "Credit Card-T". This feature also applies to FIGS. 1, 4, 5, 5A and 6.

Figure 13:
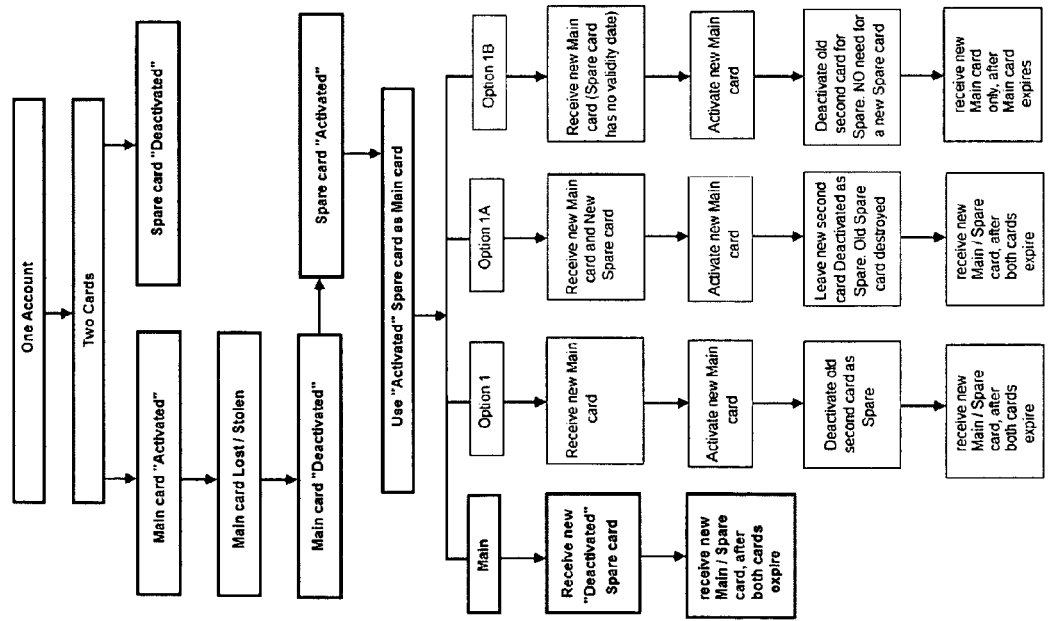
FIG. 13 is a procedural flow chart of the credit card system with options of a single account embodiment.
Figure 14:
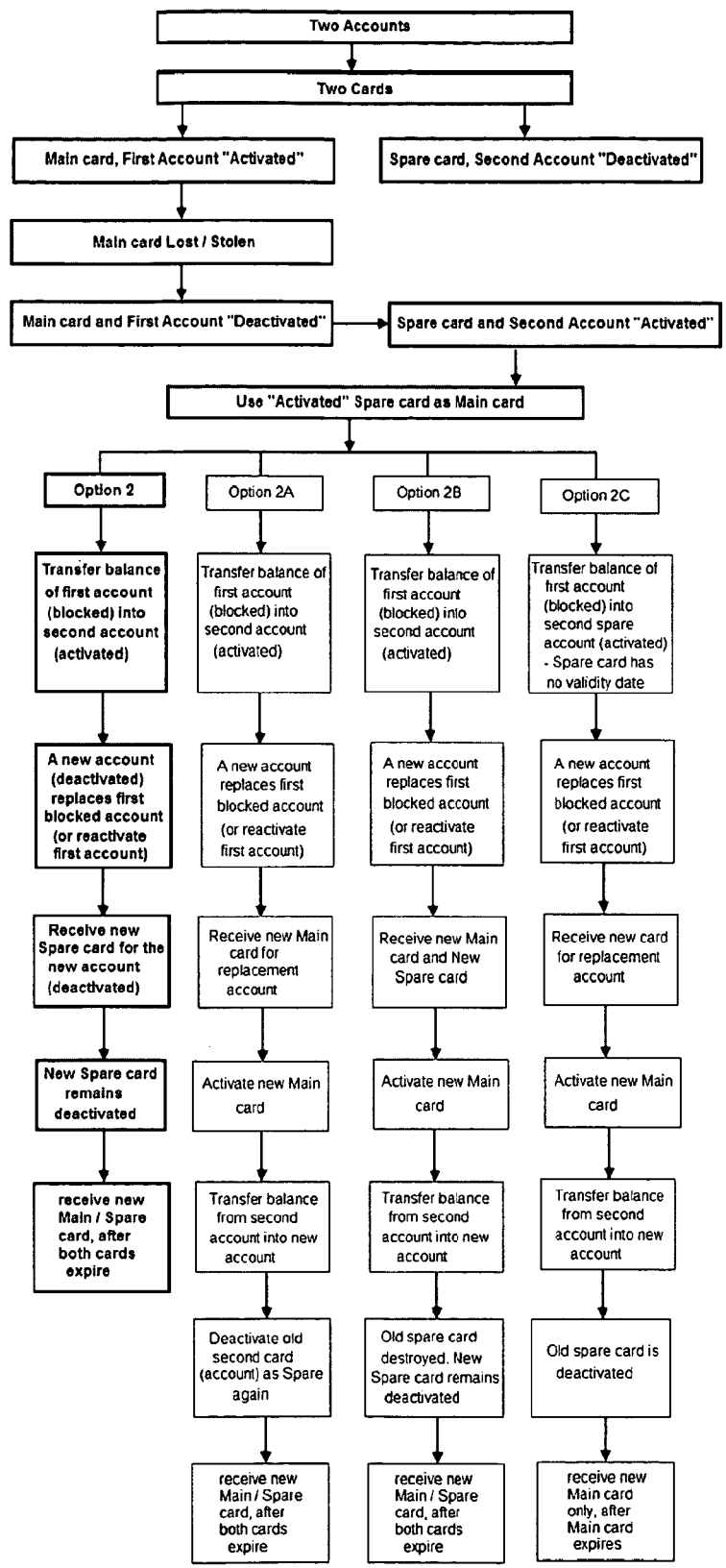
FIG. 14 is a procedural flow chart of the credit card system with options of an embodiment with two accounts.

FIG. 13 and FIG. 14 summarize, in respective flow charts, the system of the present invention as applied to two cards with active main card and deactivated or inactive spare card for a single account and active main card for a first active account and an inactive spare card in a second inactive account. The flow charts of FIGS. 13 and 14 summarize all the above options for issuing of additional cards, with their respective status and account status, as triggered by the loss or theft of an original active main card.

In another embodiment of the present invention, card replacement and automatic expiration dates may be used to effectively improve fraud prevention. This expedient is referred to herein as an "immediate card replacement system".

Fraud Prevention Application of the Immediate Card Replacement System

The Immediate Card Replacement system offers an additional application which can greatly enhance the current fraud protection measures and extend the card usage life span.

Currently the expiration dates of credit cards serve two main purposes:
a. Minimize credit card fraud
b. Minimize credit card wear and tear The Immediate Card Replacement system permits:
a. Reduction of credit/debit card fraud
b. Extension of the usage life span of credit/debit cards, with the following operational expedients:

The operation of the immediate card replacement system comprises:

1. The credit card provider opens one account with two different card numbers:
   a. First card number for the "main credit card"
   b. Second card number for the "spare credit card"
2. The credit card provider sends two credit cards to the customer:
   a. Main credit card, which is activated by the provider upon confirmation of receipt by the customer
   b. Spare credit card, remains "deactivated"
3. After a set period of time, such as one year, (the actual time period is set according to the card provider's policy) the credit card provider sends a notice to the customer informing that the spare credit card will be activated and the main credit card will be deactivated at a set time period. This notice is, for example, sent one month prior to the set time period to give the customer sufficient time (this time too can change according to the card provider policy) to call the card provider to confirm the spare card activation and main card deactivation. If the customer fails to call, both cards are deactivated until the customer calls to confirm or acknowledge activation.
4. After receiving the notice, the customer calls the credit card provider to reverse the activation and deactivation of both cards as mentioned above:
   a. Main credit card, deactivated, which can now be used as the spare credit card
   b. Spare credit card, activated, which can now be used as the main credit card
5. The credit card provider continues this process until both cards expire:
   a. Main credit card, expired
   b. Spare credit card, expired The Immediate Card Replacement System operatively minimizes card fraud and extends the useful life of the cards thereby facilitating the extension of the credit card expiration period from the normal three years to possibly five to six years.

Real Time Replacement of credit/debit cards in case of fraudulent use

1. The credit card provider opens one account with two different card numbers:
   a. First card number for the "main credit card"
   b. Second card number for the "spare credit card"
2. The credit card provider sends two credit cards to the customer:
   a. Main credit card, which is activated by the provider upon confirmation of receipt by the customer
   b. Spare credit card, remains "deactivated"
3. If any suspicious or fraudulent transaction is detected thereafter by the credit card provider, the main credit card will be deactivated.

4. If the transaction is authorized by the customer, then the main credit card is activated again.
5. If the transaction is not authorized by the customer:
   a. The spare credit card is activated to be used as the main credit card.
   b. The credit card provider then replaces the deactivated credit card (main credit card) with a new number and sends a new credit card (new spare credit card) to the customer. The new credit card (new spare credit card) remains deactivated.

Real Time Replacement for damaged credit/debit cards
1. The credit card provider opens one account with two different card numbers:
   a. First card number for the "main credit card"
   b. Second card number for the "spare credit card"
2. The credit card provider sends two credit cards to the customer:
   a. Main credit card, which is activated by the provider upon confirmation of receipt by the customer
   b. Spare credit card, remains "deactivated"
3. If the main credit card is damaged and can not be used, then the credit card provider deactivates the main credit card and activates the spare credit card:
   a. The spare credit card is activated to be used as the main credit card.
   b. The credit card provider then replaces the deactivated credit card (main credit card) with a new number and sends a new credit card (new spare credit card) to the customer. The new credit card (new spare credit card) remains deactivated.

Benefits of Immediate Card Replacement System:
1. Customer:
   a. Peace of mind and convenience that the card holder will never be left without a credit or debit card.
   b. Higher protection against fraud.
   c. More control over vendor's automatic charges against the credit card in the current e-commerce environment.
2. Credit Card Provider:
   a. The Issuer (cardholder's bank) and the Acquirer (merchant bank) and the Card Company will have the assurance that the customer will be in possession of a credit or debit card at all times, which translates into profits for the bank through additional sales.
   b. The Issuer will have more protection against credit card fraud, which translates to more profits
   c. The Issuer can extend the time period for issuing new cards, which translates to cost reduction.

While the foregoing description makes reference to particular illustrative embodiments, these examples should not be construed as limitations. Thus, the present invention is not limited to the disclosed embodiments.

The invention claimed is:

1. A credit card use and security system method for use in preventing fraudulent use, the method comprising the steps of:
   a) opening by a single individual a single account with a single financial institution, the single account with two different card numbers, with a first card number for a physical main credit card and a second card number for a physical spare credit card for the single individual, with both physical cards having pre-set expiration dates and being directly operatively linked to the single account and initially both are in a deactivated state;
   b) the single individual receiving from the single financial institution credit card provider two deactivated physical credit cards with the pre-set expiration dates, the two physical credit cards comprising a first card designated as a main credit card, which is activated by the single financial institution credit card provider upon confirmation of receipt by the single individual and provided with a PIN to enable the main physical credit card, by entry of the PIN, to physically interact, with at least one of an ATM, for the disbursement of cash and a credit card reader for authorized payment, and a second card designated as a spare credit card, which remains deactivated, with the spare physical credit card being blocked from being activated for said interaction with the ATM, for cash disbursement, and credit card reader, for payment of a sales transaction, at all times while the main physical credit card is active for said interaction, whereby the main and spare physical credit cards are never able to be active at the same time;
   c) the single financial institution credit card provider sends a notice to the single individual after a set period of time informing the single individual customer that the spare physical credit card will be activated and the physical main credit card will be deactivated at a set time period sufficient to give the single individual time to call the single financial institution card provider to confirm the physical spare card activation and physical main card deactivation;
   d) when the single individual fails to call, both physical cards are deactivated until the single individual calls to confirm activation;
   e) when the single individual calls the single financial institution credit card provider to confirm the activation and deactivation of the physical spare credit card and physical main credit card respectively as in paragraph c, the physical main credit card is deactivated, and optionally set as a new deactivated physical spare credit card and the original physical spare credit card, is activated, to become a new physical main credit card;
   f) the single financial institution credit card provider repeats the process of paragraphs c through e until both physical cards expire at the respective pre-set expiration dates.

2. A credit card use and security system method comprising the steps of:
   a) a single individual opening with a single financial institution credit card provider a single account with two different card numbers, with a first card number for a physical main credit card and a second card number for a physical spare credit card for the single individual and both physical cards being directly operatively linked to the single account and initially both are in a deactivated state;
   b) the single financial institution credit card provider disbursing the physical card designated as a main credit card and the physical card designated as spare credit card, to the single individual, the physical main credit card is activated by the single financial institution credit card provider upon confirmation of receipt by the single individual and provided with a PIN to enable the physical main credit card, by entry of the PIN, to physically interact, with at least one of an ATM, for the disbursement of cash and a credit card reader for authorized payment, and the physical spare credit card remains deactivated, with the physical spare credit card being blocked from being activated for said interaction with the ATM, for cash disbursement, and credit card reader, for payment of a sales transaction, at all times while the physical main credit card is active for said interaction, whereby the physical main and spare credit cards are never able to be active at the same time;

c) when any suspicious or fraudulent transaction is detected by the single financial institution credit card provider, the physical main credit card is deactivated;
d) when the transaction is authorized by the single individual customer, then the physical main credit card is activated again;
e) when the transaction is not authorized by the single individual;
   a. the physical spare credit card is activated to be used as the physical main credit card;
   b. the single financial institution credit card provider then replaces the deactivated credit card as main credit card with a new number and sends a new credit card as new spare credit card to the single individual with the new credit card as new spare credit card remaining deactivated.

3. A credit card use and security system method comprising the steps of:
a) a single individual opening one account with two different card numbers with a single financial institution credit card provider, with a first card number for a physical main credit card and a second card number for a physical spare credit card for the single individual customer;
b) the single financial institution credit card provider disbursing a card designated as the physical main credit card and a card designated as the spare credit card, to the single individual, the physical main credit card is activated by the single financial institution credit card provider upon confirmation of receipt by the single individual and provided with a PIN to enable the physical main credit card, by entry of the PIN, to physically interact, with at least one of an ATM, for the disbursement of cash and a credit card reader for authorized payment, and the physical spare credit card remains deactivated, with the physical spare credit card being blocked from being activated for said interaction with the ATM, for cash disbursement, and credit card reader, for payment of a sales transaction, at all times while the physical main credit card is active for said interaction, whereby the physical main and spare credit cards are never able to be active at the same time;
c) when the physical main credit card is defective and cannot be used, the physical main credit card is deactivated and the physical spare credit card is activated to be used as the physical main credit card;
d) the single financial institution credit card provider then replaces the deactivated defective physical credit card as physical main credit card with a new number and sends a new physical credit card as new physical spare credit card to the single individual with the new physical credit card as new physical spare credit card remaining deactivated.

* * * * *